United States Patent
Huynh

(10) Patent No.: US 6,950,286 B2
(45) Date of Patent: Sep. 27, 2005

(54) ACTUATOR ARM DESIGN FOR REDUCING POWER CONSUMPTION IN A DISK DRIVE DATA STORAGE DEVICE

(75) Inventor: Duane Q. Huynh, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 369 days.

(21) Appl. No.: 09/943,246

(22) Filed: Aug. 30, 2001

(65) Prior Publication Data

US 2003/0043511 A1 Mar. 6, 2003

(51) Int. Cl.7 .............................................. G11B 21/04
(52) U.S. Cl. ................................................... 360/265.9
(58) Field of Search ......................... 360/265.9, 265.7, 360/266

(56) References Cited

U.S. PATENT DOCUMENTS

| | | | | |
|---|---|---|---|---|
| 4,352,133 A | * | 9/1982 | Hager | 360/266 |
| 5,014,146 A | * | 5/1991 | Takatsuka et al. | 360/266 |
| 5,130,871 A | * | 7/1992 | Whitmore | 360/265.7 |
| 5,663,853 A | | 9/1997 | Park | |
| 5,999,372 A | * | 12/1999 | Peterson et al. | 360/265.9 |
| 6,034,842 A | | 3/2000 | Cha | |
| 6,181,519 B1 | | 1/2001 | Kim | |
| 6,473,271 B1 | * | 10/2002 | Rahman et al. | 360/266 |
| 6,538,853 B1 | * | 3/2003 | Williams et al. | 360/265.9 |

* cited by examiner

Primary Examiner—Tianjie Chen
(74) Attorney, Agent, or Firm—Bracewell & Giuliani LLP

(57) ABSTRACT

A hard disk drive utilizes an actuator arm design that significantly reduces air flow drag within the drive. The leading and trailing edges of the arm are shaped to reduce their coefficient of air flow drag in order to reduce the running current and seeking current of the disk drive during operation. As a result, the disk drive consumes less power and, thus, produces less heat which must be dissipated. The spindle motor design is reconfigured at a lower torque constant, thereby lowering the overall cost of the device.

12 Claims, 4 Drawing Sheets

US 6,950,286 B2

ACTUATOR ARM DESIGN FOR REDUCING POWER CONSUMPTION IN A DISK DRIVE DATA STORAGE DEVICE

BACKGROUND OF THE INVENTION

1. Technical Field

The present invention relates in general to an improved disk drive, and in particular to an improved actuator arm design that reduces the power consumed by data storage devices.

2. Description of the Prior Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, two or three disks are stacked vertically on a common spindle that is turned by a disk drive motor at several thousand revolutions per minute (rpm).

The only other moving part within a typical HDD is the actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions (air bearing design) on its air bearing surface (ABS) that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop directly over the desired track.

As the operating speeds of disk drives and the performance demands by users of disk drives both continue to increase, the need to make additional improvements to current drive designs persists. In particular, power consumption and heat generation by the disk drives continues to plague disk drive manufacturers. In the prior art, attempts to reduce power consumption have included, for example, shrouds around the disk stack (spindle motor and disk assembly), all of which have met with limited success. Thus, an improved disk drive design which overcomes these disadvantages while improving the performance of the disk drive would be desirable.

SUMMARY OF THE INVENTION

One embodiment of a disk drive utilizes an actuator arm design that significantly reduces air flow drag within the drive. The leading and trailing edges of the arm are aerodynamically shaped to reduce their coefficient of air flow drag in order to reduce the running current and seeking current of the disk drive during operation. As a result, the disk drive consumes less power and, thus, produces less heat which must be dissipated. The spindle motor design is reconfigured at a lower torque constant, thereby lowering the overall cost of the device.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT OF THE PRESENT INVENTION

Figure 1:
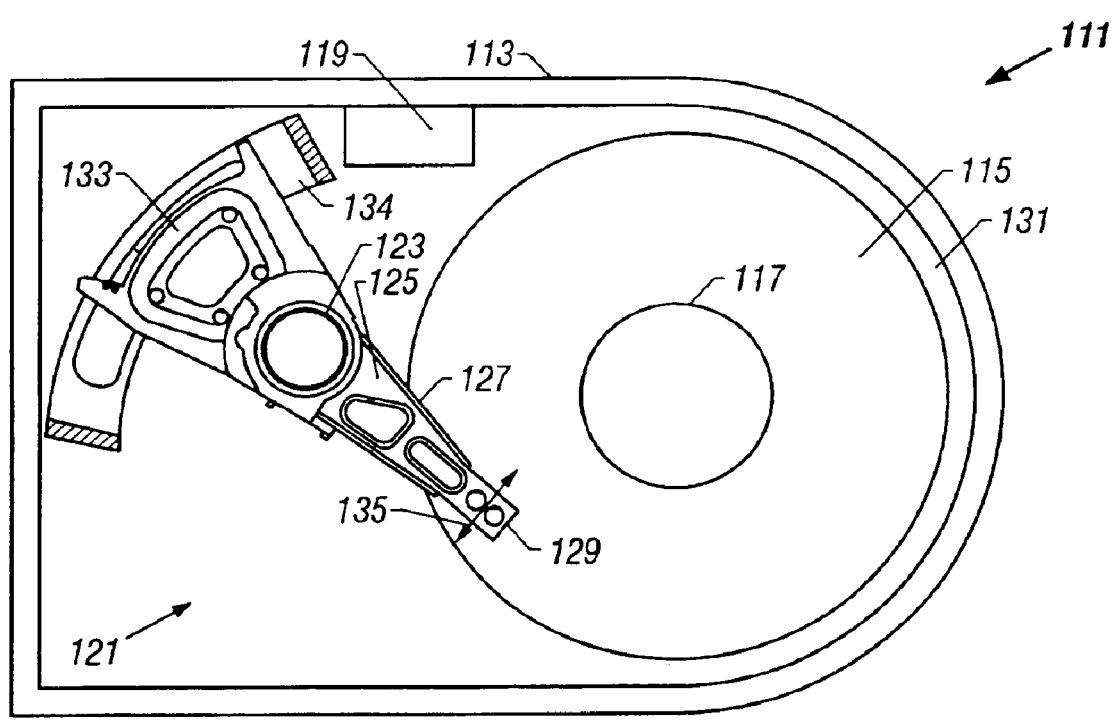
FIG. 1 is a plan view of a disk drive having an actuator arm constructed in accordance with the present invention.

Referring to FIG. 1, a schematic drawing of one embodiment of an information storage system comprising a magnetic hard disk file or drive 111 for a computer system is shown. Drive 111 has an outer housing or base 113 containing a plurality of stacked, parallel magnetic disks 115 (one shown) which are closely spaced apart. Disks 115 are rotated by a spindle motor assembly 131 having a central drive hub 117. An actuator 121 comprises an actuator body or comb having a plurality of parallel actuator arms 125 (one shown). Actuator 121 is pivotally mounted to base 113 about a pivot assembly 123. A controller 119 is also mounted to base 113 for selectively moving the comb of arms 125 relative to disks 115.

In the embodiment shown, each arm 125 has extending from it at least one cantilevered load beams or suspensions 127, a magnetic read/write transducer or head 129 mounted on a slider secured to a flexure that is flexibly mounted to each suspension 127. The read/write heads 129 magnetically read data from and/or magnetically write data to disks 115. The level of integration called head gimbal assembly is head 129 and the slider are mounted on suspension 127. Suspensions 127 have a spring-like quality which biases or urges the slider against the disk to enable the creation of the air bearing film between the slider and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves head gimbal assemblies 129 radially across tracks on the disks 115 until the heads 129 settle on the target tracks. The head gimbal assemblies operate in a conventional manner and always move in unison with one another, unless drive 111 uses multiple independent actuators (not shown) wherein the arms can move independently of one another.

Figure 2:
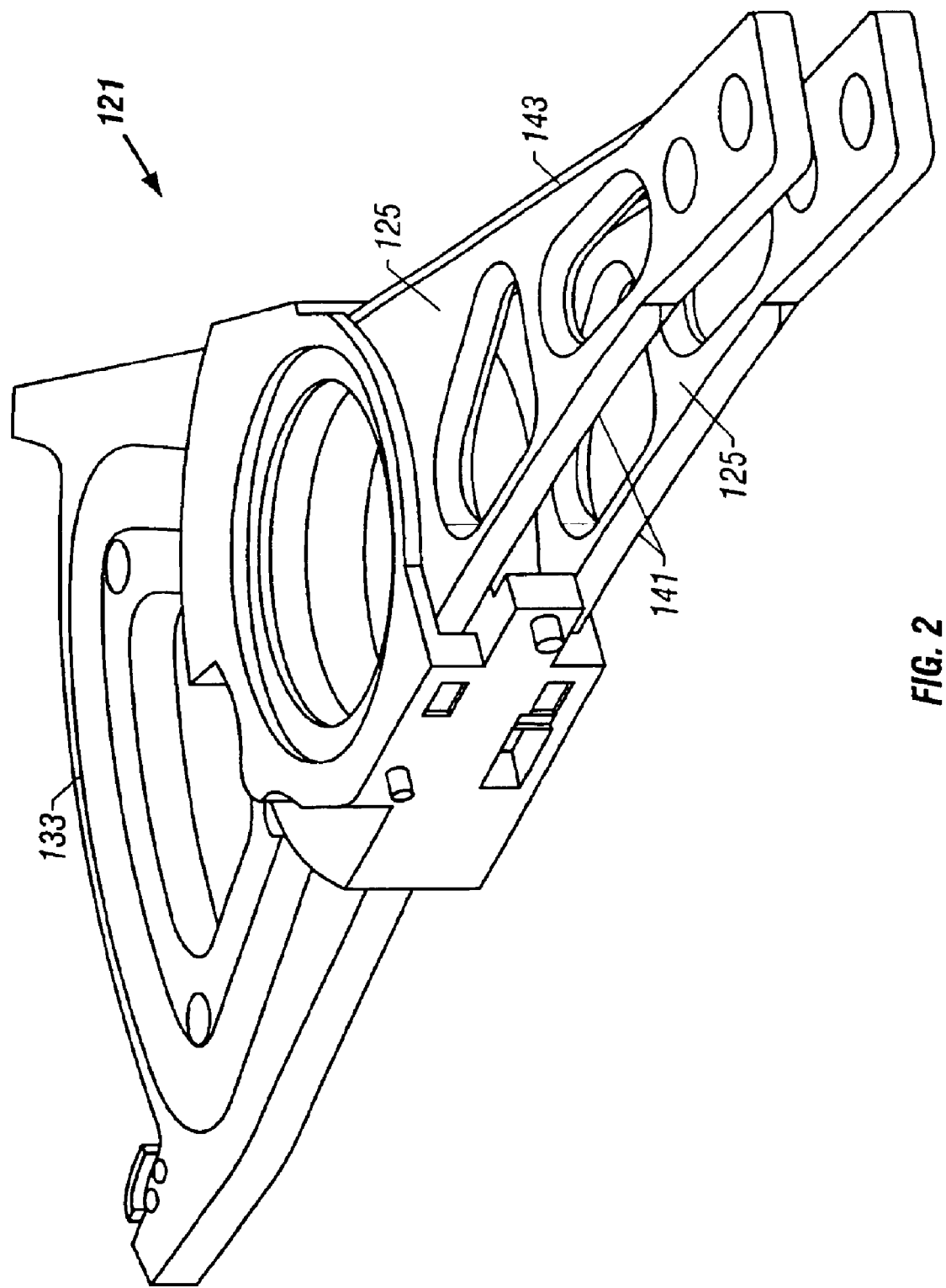
FIG. 2 is a front isometric view of the actuator arm of FIG. 1.
Figure 3:
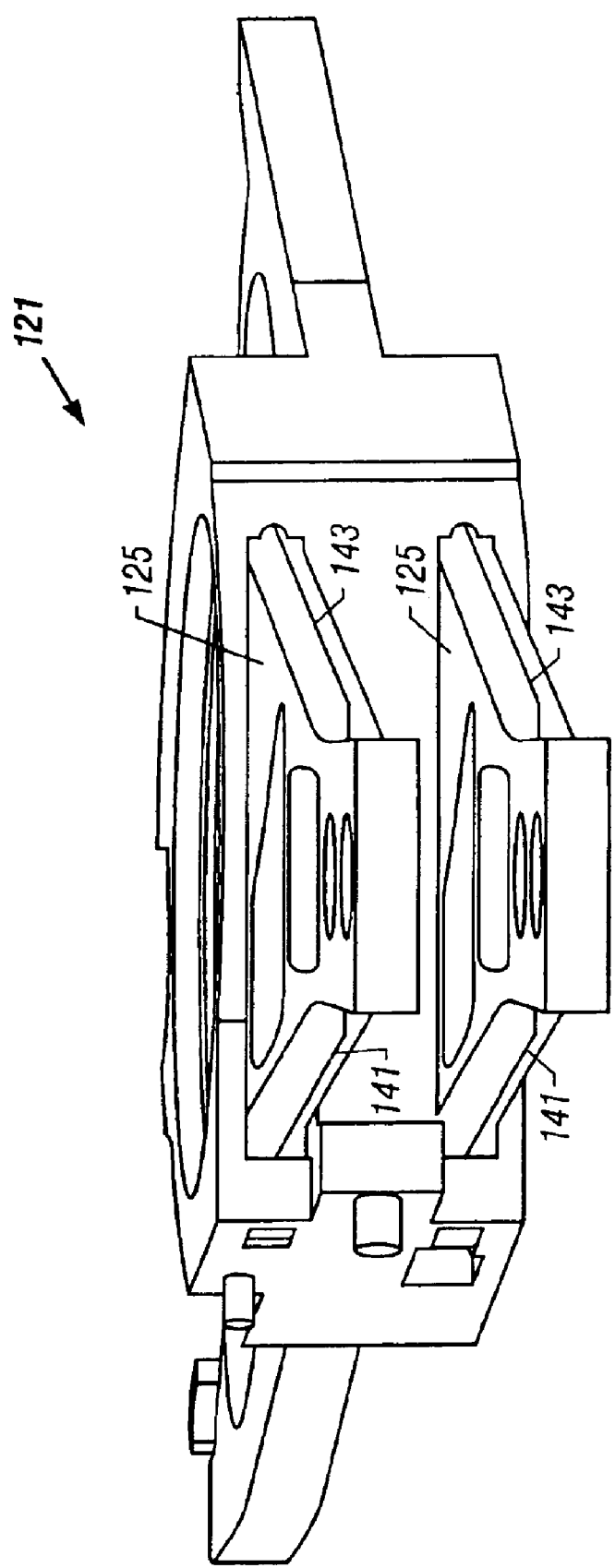
FIG. 3 is a side isometric view of the actuator arm of FIG. 1.
Figure 4:
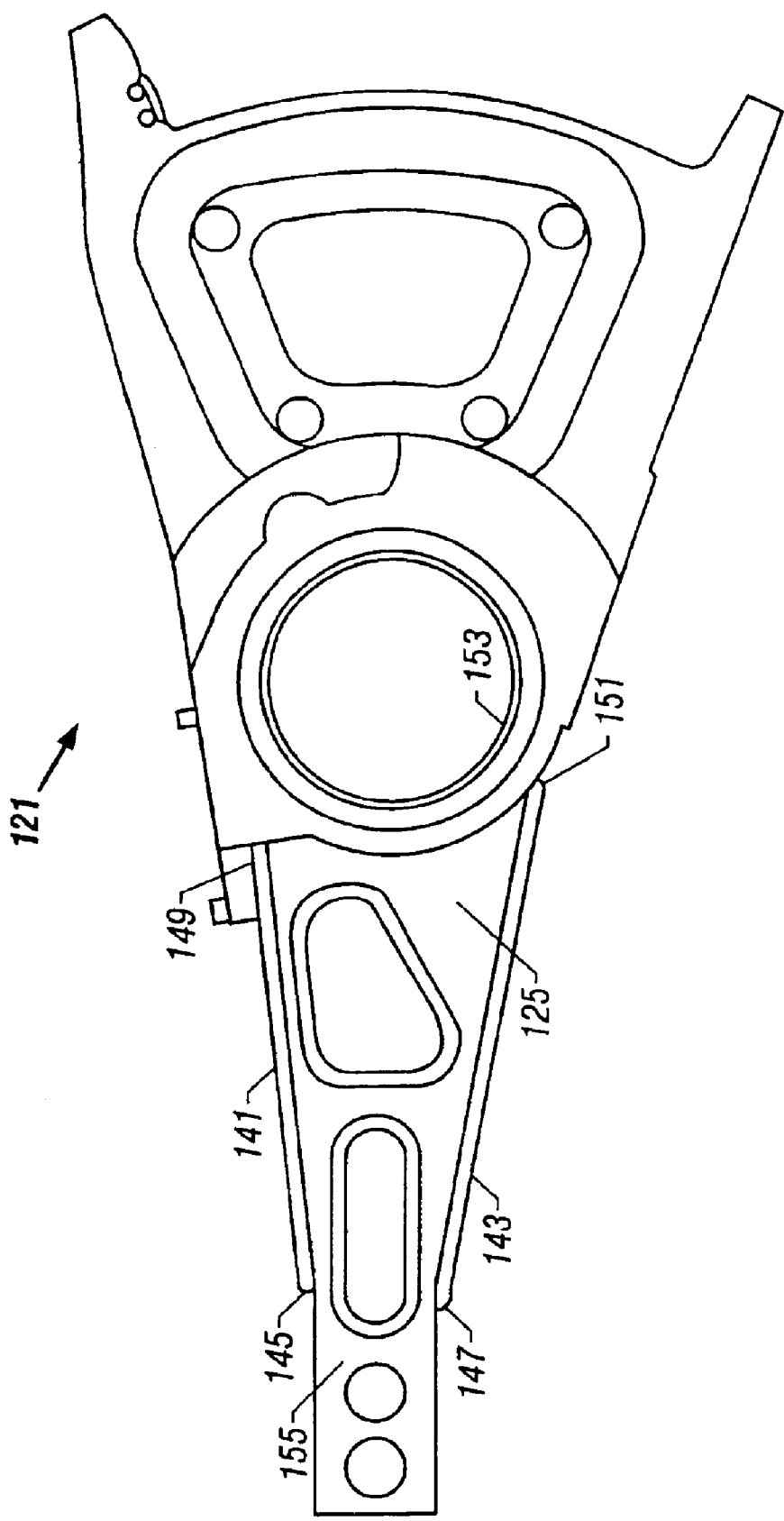
FIG. 4 is a top view of the actuator arm of FIG. 1.

Referring now to FIGS. 2–4, actuator 121 is illustrated in the preferred embodiment of the present invention. For simplicity, suspensions 127 and head gimbal assemblies 129 have been removed. In the version shown, actuator 121 is configured with a pair of parallel, substantially flat actuator arms 125, although it may have more or fewer arms 125. Each actuator arm 125 has a pair of narrow side edges 141, 143. In this document, the side edges will be referred to as leading edge 141 and trailing edge 143. In the preferred embodiment, leading edge 141 and trailing edge 143 are symmetrical and substantially identical with generally triangular cross-sectional shapes. However, leading edge 141 maybe shaped, sized, and/or tailored differently from trailing edge 143, depending upon the application for which they are intended. For example, edges 141, 143 may be rounded, tear drop-shaped, or any combination thereof.

As shown in FIG. 4, edges 141, 143 may be tapered at their distal ends 145, 147 and/or their proximal ends 149, 151, respectively. Ideally, each edges 141, 143 extends from pivot assembly aperture 153 (for pivot assembly 123) all the way to the staking tongues 155 to which suspensions 127 attach. Edges 141, 143 may be shaped and extend for the entire length of arm 125, including tongues 155. Thus, edges 141, 143 have aerodynamic profiles that reduce a coefficient of air flow drag for actuator arm 125 as actuator 121 moves relative to disk 115. In addition, the edges of the weight-reducing holes or apertures located in the interiors of arms 125 (essentially between edges 141, 143) also maybe shaped in a manner similar to those described above for edges 141, 143. Having aerodynamic profiles circumscribing these holes yields an even lower coefficient of air flow drag for arms 125.

The present invention has several advantages. A hard disk drive constructed in accordance with the present invention significantly reduces air flow drag within the drive. The aerodynamic design of the actuator arm reduces the running current and seeking current required by the disk drive during operation. As a result, the disk drive consumes less power and, thus, produces less heat which must be dissipated. In addition, the spindle motor design is modified to lower the cost of the device. The actuator arm design of the present invention is particularly well suited for hard disk drive applications wherein the disks spin at rotational speeds of 15,000 rpm or more, and wherein sub-5 ms seek times are required.

While the invention has been shown or described in only some of its forms, it should be apparent to those skilled in the art that it is not so limited, but is susceptible to various changes without departing from the scope of the invention.

What is claimed is:

1. An actuator for a data storage device, comprising:
   an actuator comb having a pivot assembly aperture and an actuator arm;
   a leading edge on the actuator arm;
   a trailing edge on the actuator arm;
   the leading edge and the trailing edge have aerodynamic profiles for reducing a coefficient of air flow drag for the actuator arm; and
   the leading and trailing edges are tapered at their respective ends in directions extending along the leading and trailing edges.

2. The actuator of claim 1 wherein the leading and trailing edges are symmetrical.

3. The actuator of claim 1 wherein the leading and trailing edges have triangular cross-sectional shapes.

4. The actuator of claim 1, further comprising a weight-reducing aperture located in an interior of the actuator arm, wherein the aperture has an aerodynamic profile for reducing a coefficient of air flow drag for the actuator arm.

5. An actuator for a data storage device, comprising:
   an actuator comb having a pivot assembly aperture and an actuator arm;
   a leading edge on the actuator arm;
   a trailing edge on the actuator arm;
   the leading edge and the trailing edge have aerodynamic profiles for reducing a coefficient of air flow drag for the actuator arm;
   the leading and trailing edges are tapered at their respective ends, and each of the leading and trailing edges extends from the pivot assembly aperture to a suspension tongue.

6. An actuator for a data storage device, comprising:
   an actuator comb having a pivot assembly aperture, a suspension tongue, an actuator arm there between, and leading and trailing edges on the actuator arm, wherein the leading and trailing edges extend from the pivot assembly aperture to the suspension tongue; and wherein
   the leading edge and the trailing edge have aerodynamic profiles with triangular cross-sectional shapes that extend from the pivot assembly aperture to the suspension tongue for reducing a coefficient of air flow drag for the actuator arm.

7. The actuator of claim 6 wherein the leading and trailing edges are symmetrical.

8. The actuator of claim 6 wherein the leading and trailing edges are tapered at their respective ends.

9. The actuator of claim 6, further comprising a weight-reducing aperture located in an interior of the actuator arm, wherein the aperture is circumscribed with an aerodynamic profile for reducing a coefficient of air flow drag for the actuator arm.

10. A hard disk drive, comprising:
    a housing;
    a spindle motor assembly mounted to the housing and having a central drive hub;
    a data storage disk mounted to the spindle motor assembly;
    a pivot assembly mounted to the housing;
    an actuator mounted to the pivot assembly for movement relative to the disk, the actuator having a voice coil, an arm with a suspension mounted thereto, a read/write head on the suspension;

a leading edge on the arm;

a trailing edge on the arm;

the leading and the trailing edges have aerodynamic profiles for reducing a coefficient of air flow drag for the arm, the leading and trailing edges are tapered at their respective ends, and each of the leading and trailing edges extends from the pivot assembly to the suspension; and weight-reducing apertures in the arm, wherein each of the apertures is circumscribed with an aerodynamic profile for reducing a coefficient of air flow drag for the actuator arm.

11. The hard disk drive of claim 10 wherein the leading and trailing edges are symmetrical.

12. The hard disk drive of claim 10 wherein the leading and trailing edges have triangular cross-sectional shapes.

* * * * *